United States Patent
Williamson et al.

(10) Patent No.: US 9,697,154 B2
(45) Date of Patent: Jul. 4, 2017

(54) MANAGING MESSAGE SIGNALED INTERRUPTS IN VIRTUALIZED COMPUTER SYSTEMS

(71) Applicant: Red Hat Israel, Ltd., Raanana (IL)

(72) Inventors: Alex Lee Williamson, Fort Collins, CO (US); Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 379 days.

(21) Appl. No.: 14/464,695

(22) Filed: Aug. 20, 2014

(65) Prior Publication Data
US 2016/0055108 A1 Feb. 25, 2016

(51) Int. Cl.
*G06F 13/32* (2006.01)
*G06F 9/455* (2006.01)
*G06F 9/50* (2006.01)

(52) U.S. Cl.
CPC .......... *G06F 13/32* (2013.01); *G06F 9/45558* (2013.01); *G06F 9/50* (2013.01); *G06F 2009/45583* (2013.01)

(58) Field of Classification Search
CPC ............... G06F 9/45558; G06F 9/50; G06F 2009/45579; G06F 2009/45583; G06F 13/32
USPC ............................................................ 718/1
See application file for complete search history.

(56) References Cited

U.S. PATENT DOCUMENTS

| | | | |
|---|---|---|---|
| 8,180,944 B2 | 5/2012 | Serebrin et al. | |
| 8,266,633 B1* | 9/2012 | Saulsbury | G06F 9/45558 718/1 |
| 8,291,135 B2 | 10/2012 | Subramanian et al. | |
| 8,453,143 B2 | 5/2013 | Mahalingam et al. | |
| 8,468,284 B2 | 6/2013 | Brice, Jr. et al. | |
| 8,631,181 B2 | 1/2014 | Feehrer et al. | |
| 2007/0168641 A1* | 7/2007 | Hummel | G06F 9/45558 711/206 |
| 2010/0146620 A1* | 6/2010 | Simeral | G06F 9/45537 726/21 |

(Continued)

OTHER PUBLICATIONS

Nakajima, Jun, "Intel Virtualization Technology Roadmap and VT-d Support n Xen", Intel Open source Technology Center, Intel Corporation 2007, 19 pages http://www-archive.xenproject.org/files/xensummit_4/VT_roadmap_d_Nakajima.pdfNAKAJIMA, JUN.

(Continued)

*Primary Examiner* — Glenn A Auve
(74) *Attorney, Agent, or Firm* — Lowenstein Sandler LLP

(57) ABSTRACT

Systems and methods for managing message signaled interrupts in virtualized computer systems. An example method may comprise: intercepting, by a hypervisor running on a host computer system, a memory read operation initiated by a virtual machine with respect to a first interrupt mapping table, the first interrupt mapping table stored by a physical device associated with the virtual machine, the memory read operation specifying an offset relative to a base address of the first interrupt mapping table; reading at least part of the first interrupt mapping table; and returning, to the virtual machine, a value referenced by the offset within a second interrupt mapping table, the second interrupt mapping table residing in a memory of the host computer system.

20 Claims, 5 Drawing Sheets

(56) References Cited

U.S. PATENT DOCUMENTS

| | | | |
|---|---|---|---|
| 2010/0169883 A1 | 7/2010 | Bogin et al. | |
| 2011/0197003 A1* | 8/2011 | Serebrin | G06F 9/45558 710/267 |
| 2013/0145055 A1* | 6/2013 | Kegel | G06F 13/28 710/26 |
| 2014/0156894 A1* | 6/2014 | Tsirkin | G06F 13/24 710/260 |
| 2014/0229647 A1* | 8/2014 | Tsirkin | G06F 13/24 710/268 |

OTHER PUBLICATIONS

Netronome White Paper, "Standardized but Flexible I/O for Self-Virtualizing Devices", Netronome Systems, Inc., 2008, 6 pages http://netronome.com/wp-content/uploads/2013/11/Netronome-Standardized-but-Flexible-I-O-for-Self-Virtualizing-Devices.pdf.
Pan, Frank, "MSI-X Emulation in Xen", Frank Pan's Technical Blog, Posted Jun. 5, 2011, 3 pages http://frankpzh.wordpress.com/2011/06/05/msi-x-emulation-in-xen/.

\* cited by examiner

MANAGING MESSAGE SIGNALED INTERRUPTS IN VIRTUALIZED COMPUTER SYSTEMS

TECHNICAL FIELD

The present disclosure is generally related to virtualized computer systems, and is more specifically related to systems and methods for managing interrupts in virtualized computer systems.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

One design aspect in a virtualized computer system is routing and processing of interrupts. "Interrupt" herein shall refer to an event that requires a processor to execute event-specific instructions, which might involve the processor's holding the current thread of execution and/or switching contexts.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
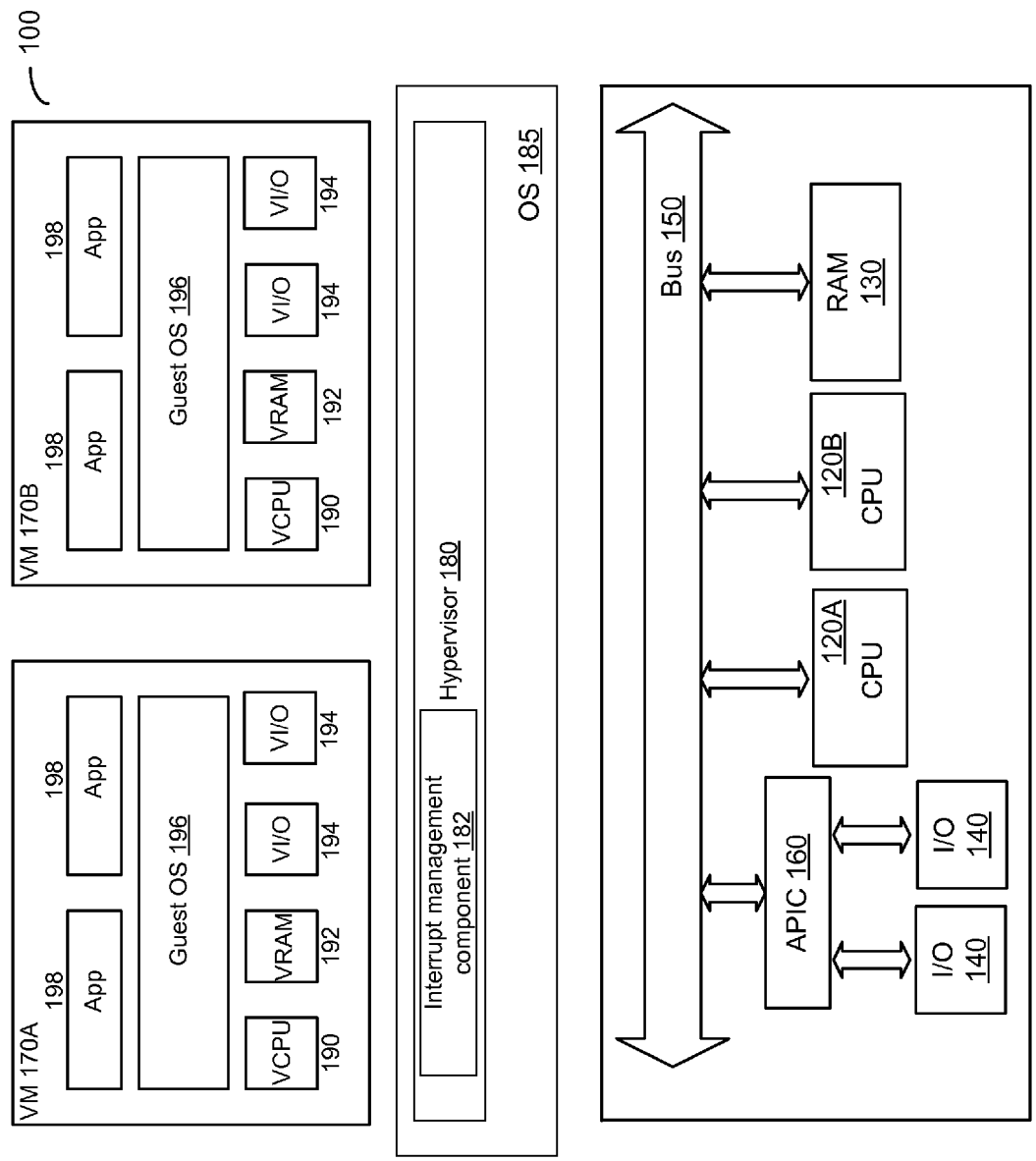
FIG. 1 depicts a high-level component diagram of an example computer system operating in accordance with one or more aspects of the present disclosure.

Described herein are methods and systems for managing message signaled interrupts in virtualized computer systems.

In a multi-processor computer system, interrupts may be processed by one or more interrupt controllers such as Advanced Programmable Interrupt Controllers (APICs), including one local APIC per processor and one or more input/output (I/O) APICs connected to I/O devices. Various computer systems may employ out-of-band and/or in-band interrupt signaling mechanisms. Out-of-band interrupt signaling involves asserting, by a peripheral device, a certain line of a control bus (referred to as an interrupt line) in order to signal an interrupt to the processor. Conversely, in-band interrupt signaling, also referred to as message signaled interrupts (MSI), involves transmitting, by a peripheral device, a message through the main data path (e.g., through a Peripheral Component Interconnect (PCI) bus).

The MSI mechanism allows a peripheral device to write, to a special memory address mapped to a control register of an interrupt controller, certain data. Each unique combination of the address and data defines an interrupt vector. The interrupt controller processes the data to determine which interrupt to trigger on which processor and delivers the interrupt to the processor.

The MSI specification (as defined in PCI 2.2 Specification by Peripheral Component Interconnect Special Interest Group (PCI-SIG)) permits a peripheral device to allocate 1, 2, 4, 8, 16, or 32 interrupt vectors. The peripheral device may be configured with a memory address mapped to a control register of an interrupt controller), and a 16-bit device identifier. The peripheral device may write, to the specified address, an interrupt identifier produced by adding the interrupt vector number to the device identifier.

The MSI-X specification (as defined in PCI 3.0 Specification by PCI-SIG) allows a larger number of interrupts (up to 2048) and assigns, to each interrupt, a separate control register address and data word acting as the device identifier and interrupt vector identifier. The device driver may configure the physical device with an interrupt mapping table (also referred to as MSI-X table) comprising a plurality of interrupt mapping entries, such that each interrupt mapping entry comprises a message address (e.g., the control register address), message data (e.g., the device identifier and interrupt vector identifier), and a vector control flag (to enable/disable sending MSI-X messages to the specified message address).

In virtualized environments, certain physical PCI devices (e.g., a network interface controller, a disk controller, an USB controller, or a soundcard) of the host computer system may be assigned to a virtual machine running on the host computer system, so that a device driver being executed by the virtual machine may access the physical device directly, rather than going through a physical device driver of the host operating system. Such an operating mode is referred to as "PCI pass through mode." The pass-through mode may be useful for various devices, such as network interface controllers and graphics cards, as it eliminates the overhead of the virtual device driver's interaction with the physical device driver, while such interaction may potentially involve context switching and/or copying large amounts of data from the memory exclusively owned by the host kernel to the virtual machine memory.

A hypervisor may implement the PCI pass-through mode for a peripheral device by invalidating the page table entry (PTE) flag for the memory page where the corresponding MSI-X table resides. A write operation initiated by a virtual machine would then be intercepted by the hypervisor, resulting in the value to be written not being forwarded to the physical device but rather used to fill in an interrupt forwarding table maintained by the hypervisor. As other memory pages of the peripheral device may have valid PTEs allowing the processor to generate PCI transaction directly, the read/write operations with respect to the physical device may not be ordered as they would be directly on the hardware. The incoherence may be detected by the virtual machine which may thus determine that it is running under a hypervisor rather than directly on the hardware.

The present disclosure provides methods for handling, by a hypervisor, read and write accesses to an MSI-X table of a peripheral device while preserving MSI-X transaction ordering. In accordance with one or more aspects of the present disclosure, the hypervisor may store in its memory a copy of an interrupt mapping table (such as the MSI-X table) of a physical device. Responsive to detecting that a virtual processor execution has been stopped because the virtual machine has initiated a read operation from the interrupt mapping table of the physical device, the hypervisor may execute a read operation from the interrupt mapping table, discard the read value (as the read operation is only performed to enforce the transaction ordering), and return to the virtual processor the value read from a copy of the interrupt mapping table stored in the hypervisor memory.

Responsive to detecting that a virtual processor execution has been stopped because the virtual machine has initiated a write operation to the interrupt mapping table of the physical device, the hypervisor may write, to the interrupt mapping table, a value retrieved from the copy of the interrupt mapping table stored in the hypervisor memory, and may then store the value supplied by the virtual machine into the copy of the interrupt mapping table stored in the hypervisor memory, as described in more details herein below. Various aspects of the above referenced methods and systems are described in details herein below by way of examples, rather than by way of limitation.

FIG. 1 depicts a high-level component diagram of an examples computer system operating in accordance with one or more aspects of the present disclosure. Example computer system 100 may comprise one or more processors 120A-120B communicatively coupled to one or more memory devices 130 and two or more I/O devices (peripheral device controllers) 140A-140B via a system bus 150.

"Processor" or "processing device" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Example computer system 100 may further comprise one or more interrupt controllers such as Advanced Programmable Interrupt Controllers (APICs) 160, including one local APIC per processor and one or more input/output (I/O) APICs connected to I/O devices 140. An APIC may be integrated within a processor or may be provided by a separate component.

Example computer system 100 may employ an in-band interrupt signaling mechanism, also referred to as message signaled interrupts (MSI), that involves transmitting, by a peripheral device, a message through the main data path (e.g., through the PCI bus). In an illustrative example, example computer system 100 may implement the MSI-X specification (as defined in PCI 3.0 Specification by PCI-SIG), in accordance to which a dedicated control register address and data word acting as the device identifier and interrupt vector identifier are assigned to each interrupt. A physical device may be configured, by the corresponding physical device driver, with an interrupt mapping table (also referred to as MSI-X table) comprising a plurality of interrupt mapping entries, such that each interrupt mapping entry comprises a message address (e.g., the control register address), message data (e.g., the device identifier and interrupt vector identifier), and a vector control flag (to enable/disable sending MSI-X messages to the specified message address).

Example computer system 100 may be employed as a host system configured to run multiple virtual machines 170, by executing a software layer 180, often referred to as "hypervisor," above the hardware and below the virtual machines. In one illustrative example, hypervisor 180 may be a component of an operating system 185 executed by example computer system 100. Alternatively, hypervisor 180 may be provided by an application running under host operating system 185, or may run directly on example computer system 100 without an operating system beneath it. Hypervisor 180 may abstract the physical layer, including processors, memory, and I/O devices, and present this abstraction to virtual machines 170 as virtual devices.

Virtual machine 170 may comprise one or more virtual processors (vCPUs) 190. Processor virtualization may be implemented by hypervisor 180 scheduling time slots on one or more physical processors 120 such that from the guest operating system's perspective those time slots are scheduled on virtual processor 190. Virtual machine 170 may execute guest operating system 196 which may utilize the underlying virtual devices, including virtual memory 192, and virtual I/O devices 194. One or more applications 198 may be running on virtual machine 170 under guest operating system 196.

In certain implementations, example computer system 100 may implement a virtual memory system, by employing the paging mechanism implemented to support a virtual memory environment where a virtual machine address space is simulated with a smaller amount of random access memory (RAM) and a backing store. The physical memory may be divided into pages of a defined size (e.g., 4 KB). Example computer system 100 may maintain a page directory and a set of page tables to translate virtual addresses into physical addresses. "Page table" herein refers to a memory data structure comprising a plurality of page table entries (PTEs) corresponding to a plurality of memory pages mapped into the virtual address space. Each PTE may further comprise a valid bit indicating whether the memory page is currently present in the physical memory frame referenced by the corresponding page table entry. If a page being accessed by a virtual machine is not currently present in the physical memory, a page-fault exception may be generated, responsive to which the host computer system may read the page from the backing store and continue executing the virtual machine.

As noted herein above, example computer system 100 may be configured to support PCI the pass-through operating mode for one or more physical I/O devices 140. A physical device operating in the PCI pass-through mode is assigned to a virtual machine running on the host computer system, so that a device driver being executed by the virtual machine may access the physical device directly, rather than going through a physical device driver of the host operating system.

Hypervisor 180 may comprise an interrupt manager component 182 for supporting various aspects of interrupt virtualization. Interrupt manager component 182 may be configured to implement the methods for managing read and write accesses to MSI-X tables in accordance with one or more aspects of the present disclosure, as described in details herein below.

As noted herein above, hypervisor 180 may implement the PCI pass-through mode for a peripheral device by invalidating the page table entry (PTE) flag for the memory page where the corresponding interrupt mapping table (e.g., the MSI-X table) resides. Thus, memory access operations initiated by a virtual machine with respect to the interrupt mapping table would be intercepted by the hypervisor.

Figure 2:
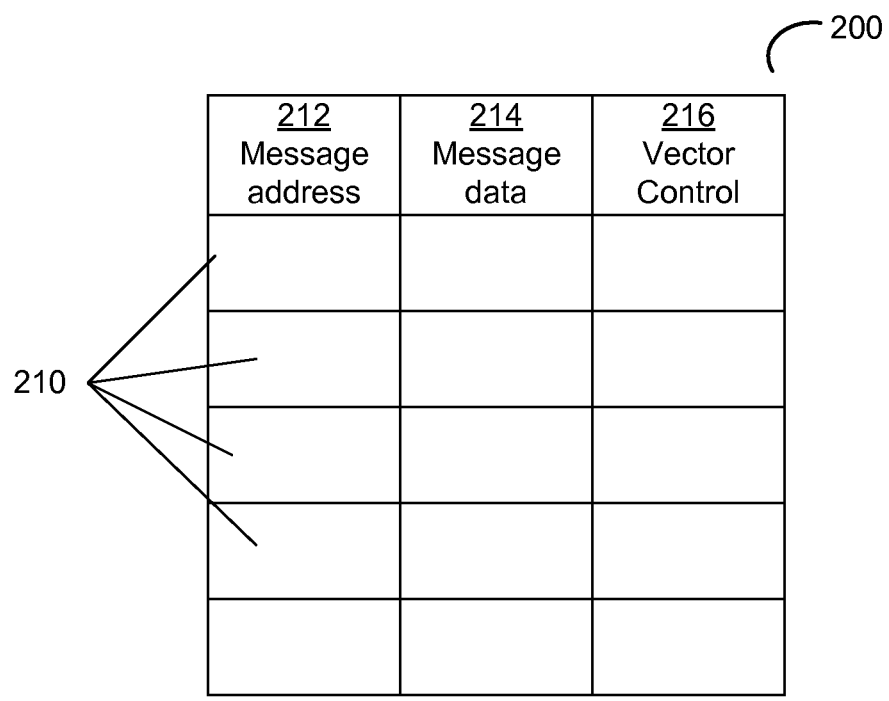
FIG. 2 schematically illustrates an example structure of an interrupt mapping table, in accordance with one or more aspects of the present disclosure.

Hypervisor 180 may store in its memory a copy of an interrupt mapping table (such as the MSI-X table) of a physical device. FIG. 2 schematically illustrates an example structure of an interrupt mapping table, in accordance with one or more aspects of the present disclosure. As schematically illustrated by FIG. 2, interrupt mapping table 300 may comprise a plurality of interrupt mapping entries 210 corresponding to a plurality of interrupt vectors assigned to the peripheral device. Each interrupt mapping entry may comprise a Message Address field 212, a Message Data field 214, and a Vector Control Flag 216. Message address field 212 contains the address of the memory write transaction. Message Data filed 214 specifies at least part of data to be written to the specified memory address by the peripheral device in order to signal an interrupt. Vector Control Flag 216 indicates whether the peripheral device may use the corresponding table entry for interrupt signaling. If the vector control flag is set, the peripheral device is prohibited from using the table entry for sending interrupt messages.

Figure 3:
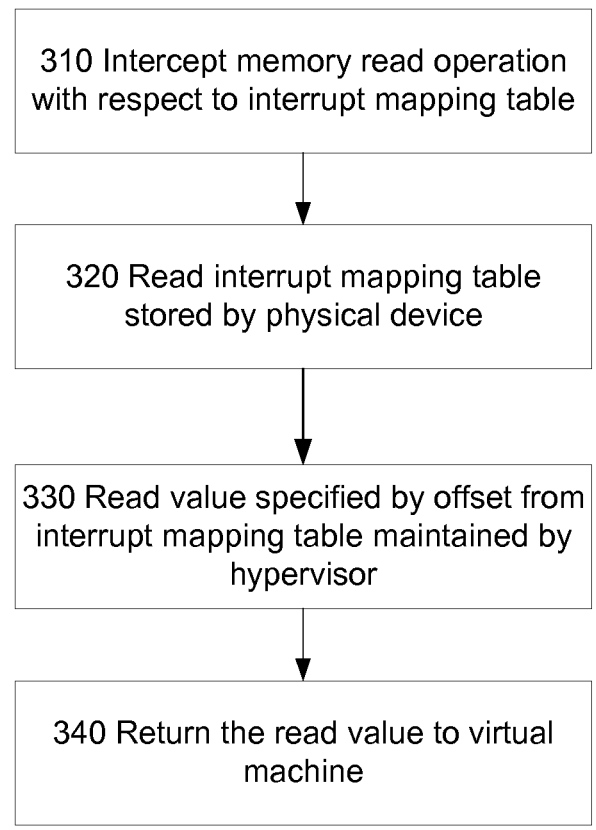
FIG. 3 depicts a flow diagram of an example method for processing, by a hypervisor, a read operation with respect to an interrupt mapping table of a physical device associated with a virtual machine, in accordance with one or more aspects of the present disclosure.

Responsive to detecting that a virtual processor execution has been stopped because the virtual machine has initiated a read operation from the interrupt mapping table of the physical device, the hypervisor may execute a read operation from the interrupt mapping table, discard the read value (as the read operation is only performed to enforce the transaction ordering), and return to the virtual processor the value read from the copy of the interrupt mapping table stored in the hypervisor memory, as described in more details herein below with reference to FIG. 3.

Figure 4:
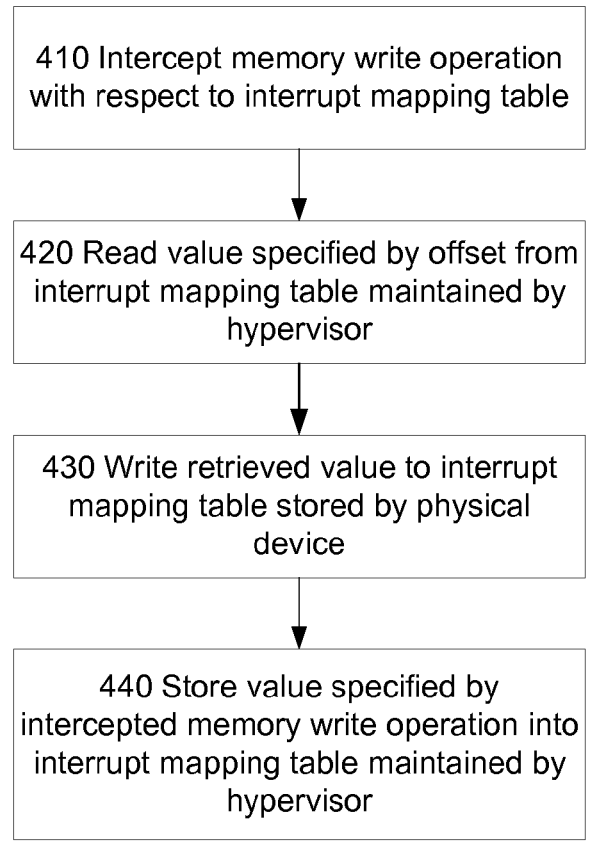
FIG. 4 depicts a flow diagram of an example method for processing, by a hypervisor, a write operation with respect to an interrupt mapping table of a physical device associated with a virtual machine, in accordance with one or more aspects of the present disclosure.

Responsive to detecting that a virtual processor execution has been stopped because the virtual machine has initiated a write operation to the interrupt mapping table of the physical device, the hypervisor may write, to the interrupt mapping table, a value retrieved from the copy of the interrupt mapping table stored in the hypervisor memory, and may then store the value supplied by the virtual machine into the copy of the interrupt mapping table stored in the hypervisor memory, as described in more details herein below with reference to FIG. 4.

FIG. 3 depicts a flow diagram of an example method 300 for processing, by a hypervisor, a read operation with respect to an interrupt mapping table of a physical device associated with a virtual machine, in accordance with one or more aspects of the present disclosure. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more processors of the computer system executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a hypervisor running on a host computer system may intercept a memory read operation initiated by a virtual machine with respect to a memory page comprising an interrupt mapping table of a physical device. The memory read operation may identify the location to be read by specifying the offset relative to the base address of the interrupt mapping table. In certain implementations, the interrupt mapping table may be provided by a table compliant with MSI-X specification. The physical device may be associated with the virtual machine in the PCI pass-through mode, as described in more details herein above.

In certain implementations, intercepting the memory read operation may comprise invalidating a page table entry (PTE) corresponding to the memory page comprising the interrupt mapping table of the physical device, as described in more details herein above.

At block 320, the hypervisor may execute a read operation with respect to the interrupt mapping table, by reading a value referenced by either the offset specified by the intercepted memory read operation or by a pre-determined offset (e.g., zero offset). The hypervisor may discard the read value, as the read operation is only performed to enforce the transaction ordering.

At block 330, the hypervisor may read, from an interrupt mapping table maintained by the hypervisor in the memory of the host computer system, a value referenced by the offset specified by the intercepted memory read operation. In certain implementations, the interrupt mapping table maintained by the hypervisor in the memory of the host computer system may be a copy of the interrupt mapping table of the physical device.

At block 340, the hypervisor may return the read value to the virtual machine and resume the virtual machine execution. Responsive to completing operations referenced by block 340, the method may terminate.

FIG. 4 depicts a flow diagram of an example method 400 for processing, by a hypervisor, a write operation with respect to an interrupt mapping table of a physical device associated with a virtual machine, in accordance with one or more aspects of the present disclosure. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more processors of the computer system executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a hypervisor running on a host computer system may intercept a memory write operation initiated by a virtual machine with respect to a memory page comprising an interrupt mapping table of a physical device. The memory write operation may identify the new value to be written and may further identify the location to be written to by specifying the offset relative to the base address of the interrupt mapping table. In certain implementations, the interrupt mapping table may be provided by a table compliant with MSI-X specification. The physical device may be associated with the virtual machine in the PCI pass-through mode, as described in more details herein above.

In certain implementations, intercepting the memory write operation may comprise invalidating a page table entry (PTE) corresponding to the memory page comprising the interrupt mapping table of the physical device, as described in more details herein above.

In certain implementations, responsive to intercepting a memory write request with respect to an interrupt mapping table of a physical device, the hypervisor may ascertaining that the specified memory location within the interrupt mapping table is not being modified by another processor of the host computer system.

At block 420, the hypervisor may read, from an interrupt mapping table maintained by the hypervisor in the memory of the host computer system, a value referenced by the offset specified by the intercepted memory write operation. In certain implementations, the interrupt mapping table maintained by the hypervisor in the memory of the host computer system may be a copy of the interrupt mapping table of the physical device.

At block 430, the hypervisor may write, to the specified location within the interrupt mapping table stored by the physical device, the value retrieved from the interrupt mapping table maintained by the hypervisor in the memory of the host computer system.

At block 440, the hypervisor may store the value specified by the intercepted memory write operation into the interrupt mapping table maintained by the hypervisor in the memory of the host computer system. The hypervisor may then resume the virtual machine execution. Responsive to completing operations referenced by block 440, the method may terminate.

Figure 5:
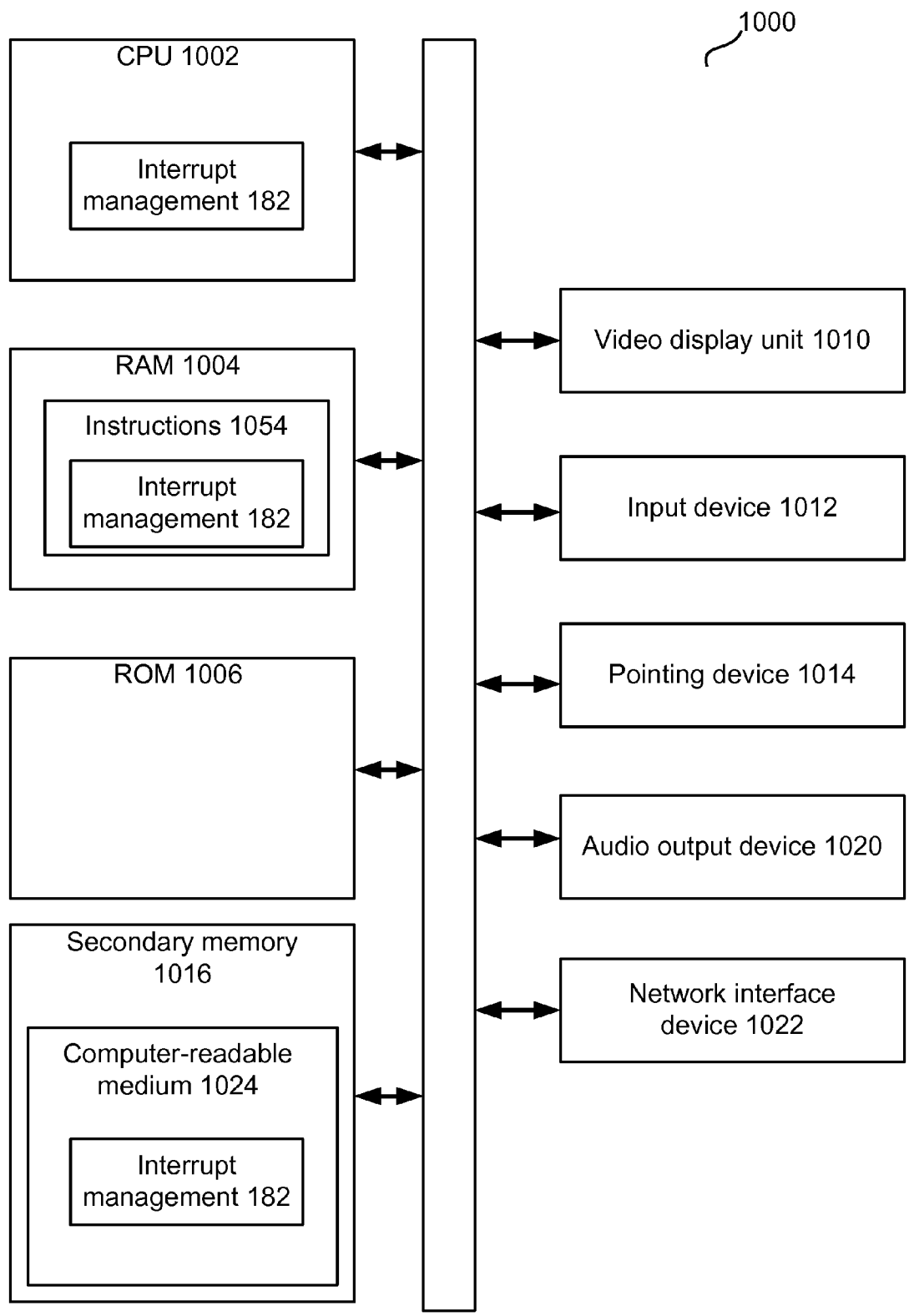
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 1000 may correspond to example computer system 100 of FIG. 1.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface controller 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions 1054 encoding any one or more of the methods or functions described herein, including instructions encoding interrupt manager component 182 of FIG. 1 implementing methods 300 and/or 400 for managing interrupts in virtualized computer systems.

Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
intercepting, by a processor of a host computer system, a memory read operation initiated by a virtual machine with respect to a first interrupt mapping table, the first interrupt mapping table stored by a physical device associated with the virtual machine, the memory read operation specifying an offset relative to a base address of the first interrupt mapping table;
reading at least part of the first interrupt mapping table; and
returning, to the virtual machine, a value referenced by the offset within a second interrupt mapping table, the second interrupt mapping table residing in a memory of the host computer system.

2. The method of claim 1, further comprising:
maintaining the second interrupt mapping table.

3. The method of claim 1, wherein the second interrupt mapping table is a copy of the first interrupt mapping table.

4. The method of claim 1, wherein at least one of the first interrupt mapping table and the second interrupt mapping table comprises a plurality of interrupt mapping entries, each interrupt mapping entry comprising a control register address associated with an interrupt vector, a data item associated with the interrupt vector, and a vector control flag associated with the interrupt vector.

5. The method of claim 1, wherein at least one of the first interrupt mapping table and the second interrupt mapping table complies with MSI-X specification.

6. The method of claim 1, wherein the physical device is associated with the virtual machine in a pass-through mode.

7. The method of claim 1, wherein intercepting the memory read operation comprises invalidating a page table entry corresponding to a memory page containing the first interrupt mapping table.

8. The method of claim 1, wherein reading at least part of the first interrupt mapping table comprises discarding the read part of the first interrupt mapping table.

9. The method of claim 1, wherein reading at least part of the first interrupt mapping table comprises reading a value referenced by the offset within the first interrupt mapping table.

10. A method, comprising:
intercepting, by a processor of a host computer system, a memory write operation initiated by a virtual machine with respect to a first interrupt mapping table, the first interrupt mapping table stored by a physical device associated with the virtual machine, the memory write operation specifying a new value to be written and an offset relative to a base address of the first interrupt mapping table;
reading a stored value from a first memory location identified by the offset within a second interrupt mapping table, the second interrupt mapping table residing in a memory of the host computer system;
writing the stored value to a second memory location specified by the offset within the first interrupt mapping table; and
storing the new value in the first memory location.

11. The method of claim 10, further comprising:
maintaining the second interrupt mapping table.

12. The method of claim 10, wherein the second interrupt mapping table is a copy of the first interrupt mapping table.

13. The method of claim 10, wherein at least one of the first interrupt mapping table and the second interrupt mapping table comprises a plurality of interrupt mapping entries, each interrupt mapping entry comprising a control register address associated with an interrupt vector, a data item associated with the interrupt vector, and a vector control flag associated with the interrupt vector.

14. The method of claim 10, wherein at least one of the first interrupt mapping table and the second interrupt mapping table complies with MSI-X specification.

15. The method of claim 10, wherein the physical device is associated with the virtual machine in a pass-through mode.

16. The method of claim 10, wherein intercepting the memory write operation comprises invalidating a page table entry corresponding to a memory page containing the first interrupt mapping table.

17. The method of claim 10, wherein intercepting the write operation comprises ascertaining that the first interrupt mapping table is not being modified by another processor of the host computer system.

18. A computer system comprising:
a memory; and
a processor, operatively coupled to the memory, to:
intercept a memory read operation initiated by a virtual machine with respect to a first interrupt mapping table, the first interrupt mapping table stored by a physical device associated with the virtual machine, the memory read operation specifying an offset relative to a base address of the first interrupt mapping table;

read at least part of the first interrupt mapping table; and return, to the virtual machine, a value referenced by the offset within a second interrupt mapping table, the second interrupt mapping table residing in the memory.

19. A computer-readable non-transitory storage medium comprising executable instructions that, when executed by a processor of a host computer system, cause the processor to:

intercept, by the processor, a memory write operation initiated by a virtual machine with respect to a first interrupt mapping table, the first interrupt mapping table stored by a physical device associated with the virtual machine, the memory write operation specifying a new value to be written and an offset relative to a base address of the first interrupt mapping table;

read a stored value from a first memory location identified by the offset within a second interrupt mapping table, the second interrupt mapping table residing in a memory of the host computer system;

write the stored value to a second memory location specified by the offset within the first interrupt mapping table; and store the new value in the first memory location.

20. The computer-readable non-transitory storage medium of claim 19, further comprising executable instructions to cause the processor to:

ascertain that the second memory location is not being modified by another processor of the host computer system.

* * * * *